April 12, 1960 C. J. CHRISTIANSEN Re. 24,806

MACHINE FOR DUST FREE GRINDING OF MATERIALS
AS EAR CORN FOR LIVESTOCK FEED

Original Filed Feb. 11, 1957 2 Sheets-Sheet 1

INVENTOR.
Carl J. Christiansen
BY
ATTORNEY.

April 12, 1960 C. J. CHRISTIANSEN Re. 24,806

MACHINE FOR DUST FREE GRINDING OF MATERIALS
AS EAR CORN FOR LIVESTOCK FEED

Original Filed Feb. 11, 1957 2 Sheets-Sheet 2

INVENTOR.
Carl J. Christiansen
BY
ATTORNEY.

United States Patent Office

Re. 24,806
Reissued Apr. 12, 1960

24,806

MACHINE FOR DUST FREE GRINDING OF MATERIALS AS EAR CORN FOR LIVESTOCK FEED

Carl J. Christiansen, Joplin, Mo.

Original No. 2,873,921, dated February 17, 1959, Serial No. 639,559, February 11, 1957. Application for reissue July 22, 1959, Serial No. 828,923.

5 Claims. (Cl. 241—186)

Matter enclosed in heavy brackets [ ] appears in the original patent but forms no part of this reissue specification; matter printed in italics indicates the additions made by reissue.

This invention relates to a mill for reducing materials to small particle size and has for its primary object the production of such particles substantially in the absence of dust.

It is one object of the present invention to provide a dust-free feed for livestock, for example from ear corn wherein not only are the kernels shelled from the cobs, but the corn is fractured, the shucks are torn, and the kernels are cracked, thus producing a more palatable feed.

Another important object of the present invention is to provide a machine for producing a feed, the machine acting upon the cobs in a manner to fragment the same by a combined striking and twisting action thereby eliminating the dust problem as above intimated.

A further object of the instant invention is to provide in a single machine, structure capable of handling the cobs to fragment the same as well as remove the kernels therefrom by rasping action and which ultimately cracks the kernels by pressure exerted thereon through use of pressure rolls.

Other objects include important details of construction to be made clear or become apparent as the following specification progresses, reference being had to the accompanying drawings, wherein.

Figure 1:
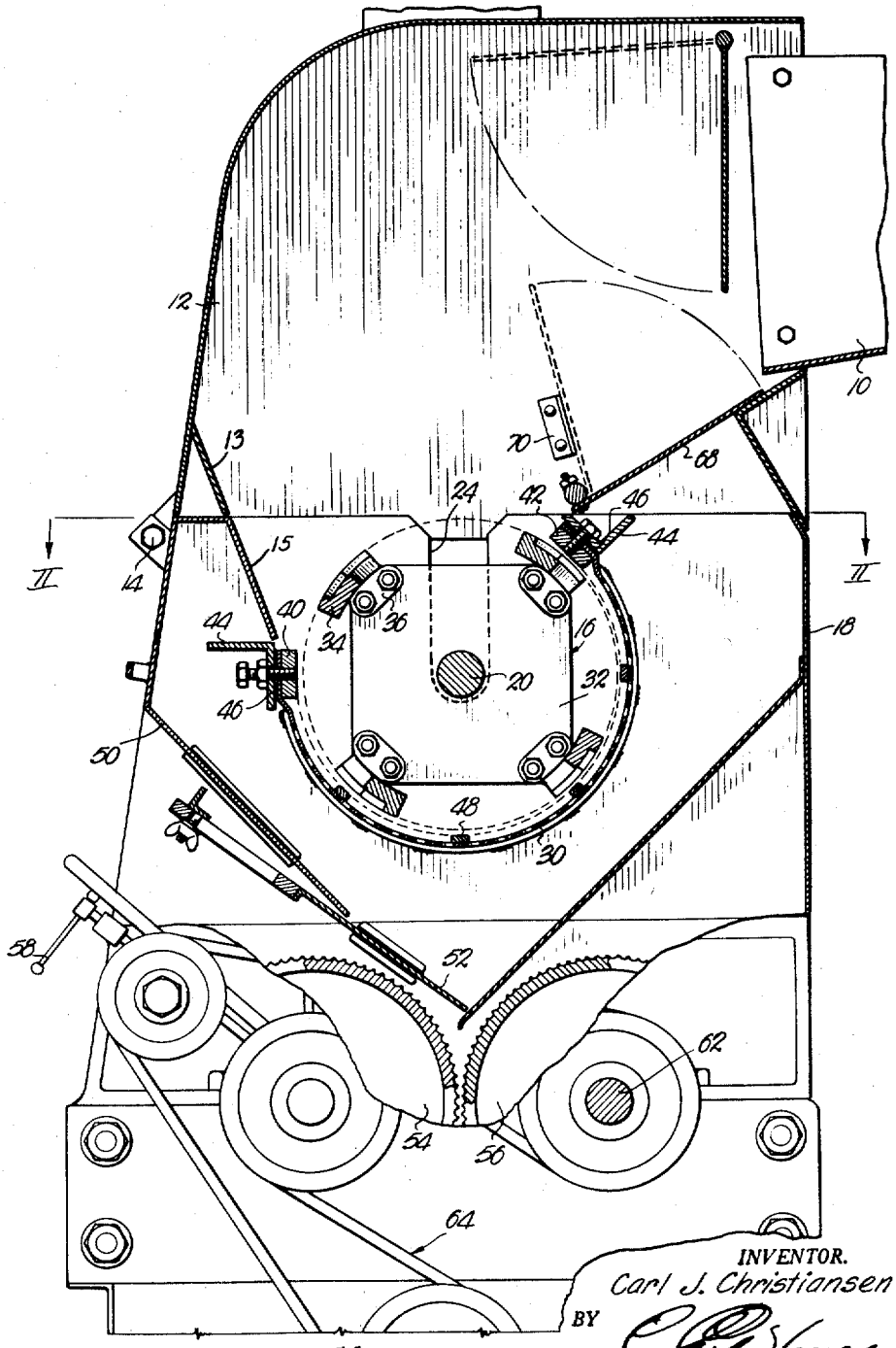
Figure 1 is a fragmentary, side elevational view of a material grinding mill made pursuant to the instant invention, parts being broken away and in section to reveal details of construction.

Material to be handled by the machine illustrated in the drawings is fed to an adjustable hopper 10 in any suitable manner such as by use of an elevator (not shown), which hopper 10 communicates directly with a hood 12 mounted for rearward tilting by virtue of the provision of hinge means 14.

A reel broadly designated by the numeral 16, is disposed within hollow body portion 18 so as to receive the material from the hood 12, shaft 20 forming a part of the reel 16 being mounted for rotation on a horizontal axis. Bearings 22 for the shaft 20 are removably carried by slots 24 formed in the sides of the body 18. A drive shaft 26 is operably coupled with the driven shaft 20 by chain and sprocket wheel means 28.

The reel 16 is partially housed within a transversely arcuate, elongated screen 30 rigidly mounted within the body 18 and partially surrounding the reel 16 therebeneath in eccentric relationship to the latter.

A plurality of polygonal plates 32 rigid to the shaft 20, support a plurality of elongated bars 34 at the corners of the plates 32 through the medium of brackets 36.

Figure 2:
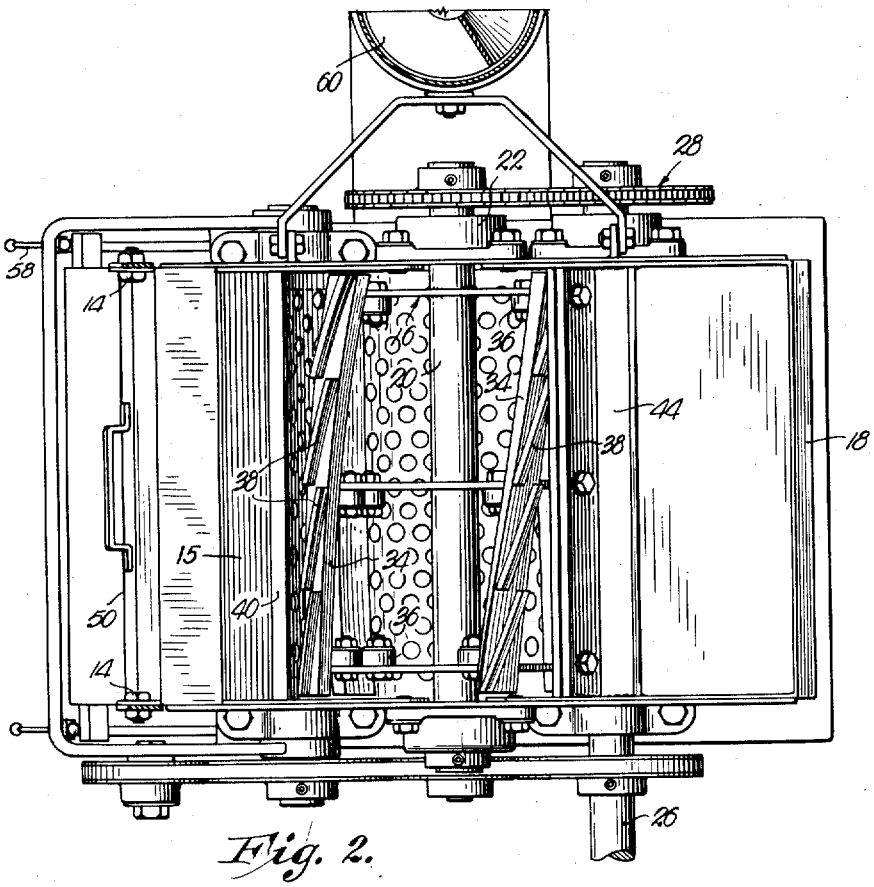
Fig. 2 is a fragmentary, cross-sectional view taken on line II—II of Fig. 1.
Figure 3:
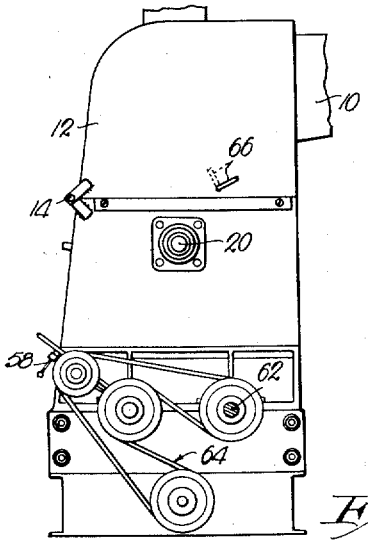
Fig. 3 is an elevational view similar to Fig. 1 on a reduced scale.
Figure 4:
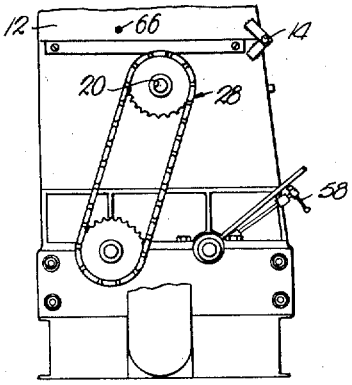
Fig. 4 is a fragmentary, elevational view showing that side of the machine opposite to Figs. 1 and 3.

The said corners of the plates 32 are offset circumferentially of the shaft 20 to the end that the bars 34, which extend longitudinally of the reel 16, are disposed at an angle as best seen in Fig. 2.

Each of the bars 34 is in turn provided with a plurality of lugs 38 mounted on the outermost faces thereof and disposed at an angle relative to both the longitudinal and transverse axes of the bars 34. Consequently, neither the longitudinal axes of the bars 34 nor the longitudinal axes of the lugs 38 are in parallelism with the axis of rotation of reel 16 about the shaft 20.

The body 18 supports a pair of elongated breaker elements 40 and 42 adjacent the two uppermost edges of the screen 30 through the medium of mounting brackets 44 carried by the body 18. The elements 40 and 42 extend longitudinally of the reel 16 and the screen 30 in parallelism with the shaft 20 closely adjacent the periphery of reel 16, but in spaced relationship to lugs 38. The distance between the elements 40 and 42 and the lugs 38 may be adjusted by insertion of shims or spacers 46 between the elements 40 and 42 and their mounting brackets 44.

Screen 30 has a plurality of elongated, longitudinally extending ribs 48 mounted on the inner face thereof and spaced apart circumferentially of the screen 30. Ribs 48 are in parallelism with the axis of rotation of reel 16 and, like the elements 40 and 42, are closely adjacent the ribs 38 but spaced therefrom.

Reel 16 rotates anticlockwise viewing Fig. 1 and, therefore, the distance between the periphery of reel 16 and the inner face of screen 30 progressively decreases as the uppermost element 42 is approached. Consequently, the distance between the lugs 38 and the elements 40 and 42, as well as the ribs 48, progressively decreases in the direction of rotation of the reel 16.

An inclined guide plate 13 forming a part of hood 12 and extending the entire distance between the side walls of hood 12, cooperates with guide structure on body 18 including inclined plate portion 15 normally aligned with guide plate 13 to direct the material to be fractured directly into the space between breaker element 40 and the periphery of reel 16 whereby shelling of the ears, fracturing of the cobs and shredding of the shucks is quickly accomplished during rotation of reel 16. It is to be noted that the lower margin of guide portion 15 terminates above breaker element 40 and guide plate 13 and guide portion 15 extend upwardly away from reel 16 to assure proper gravitation of the ears into positions where the same are most efficiently broken by the machine.

The unique selection of parts and disposition thereof, particularly the angularity of the bars 34 and lugs 38 with respect to the elements 40—42 and ribs 48, permit the machine to handle a large class of materials to reduce the same into smaller fragments, granules or particles without substantial formation of dust. For example, ear corn, including that which is covered or partially covered with shucks, may be fed to the reel 16 and the same will emanate from the screen 30, without clogging of the latter, in a particle size depending upon the mesh of the screen 30.

For the most part, the first action that is imparted to the ears is that of removing the kernels, not only by a rasping action, but more particularly, by successive striking of the ears by the bars 34 since, as is clear in the drawings, the bars 34 are spaced apart and adapted to receive the ears therebetween. In any event, neither the cobs, the shucks nor the kernels themselves are subjected to a grinding or hammer effect as is true with many conventional mills, and therefore, the dust problem is virtually eliminated.

The kernels that are initially removed from the cob are free to drop into the bottom of the body 18 since they readily pass through the screen 30 and such immediate removal of the kernels is to be desired so as to avoid any tendency of grinding the same into a dusty condition. The plurality of ribs 48 on the inner face of the screen 30 function to guide or direct the kernels and all other particles capable of passing through the screen 30 immediately upon separation.

The action that is imparted to the cobs is of itself unique since the lugs 38 acting thereon and cooperating with the breaker elements 40 and 42, tend to twist the cob and in so doing, break the same into small fragments, all without any hammering or grinding action whatsoever.

An inspection gate 50 in the body 18, permits the operator to adjust the flow of the materials from the body 18 to a pressing station therebelow. Adjustment of gate 52 permits a steady and continuous flow of the kernels, cob fragments and shredded shucks to a pair of oppositely rotating rollers 54 and 56 therebeneath. The distance between the externally crimped pressure rollers 54 and 56 may be adjusted through operation of adjusting mechanism 58 and the finished product is fed to a suitable elevator 60 communicating with the machine below the rollers 54—56. Any suitable power means not shown may be coupled with shaft 62 for roller 56 to drive the latter and through the medium of belt and pulley means 64, roller 54 is driven in the opposite direction.

The rollers 54—56 crack the corn and admix the same with the cob fragments so that the end product is substantially free of dust and excellent in all respects as a feed for livestock.

The mill above described does a better and more uniform job of preparing dust-free ear corn feed. A very important reason is because no attempt is made to do the complete job in one common reducing chamber. The cobs are sponge-like and hard; the kernels are hard and flinty; the shucks are fibrous. By separating the kernel from the cob and shuck, the cob and shuck can be reduced without fracturing or powdering the kernel in the cylinder and the corn thereupon cracked between the rolls to produce dust-free, uniform, granulated ear corn feed. Dust-free, granulated or cracked feeds produce between feeding results. The hammer mill will handle any grain but not in the absence of dusting. The burr mill will do a good job on shell corn or ear corn but not on small seeded grains such as oats, wheat, milo, etc. The mill of the instant invention will handle all grains, including ear corn, and prepare it in a dust-free manner.

In the event that it is desired to use the machine for crimping oats, cracking corn, milo and other grains wherein the use of reel 16 is unnecessary, the operator, through use of handle 66, may swing a divider plate 68 to the dotted line position shown in Fig. 1 against stop 70, the material entering the hood 12 through hopper 10 by passing the reel 16 and falling directly into the body 18 as is obvious from the drawings.

Having thus described the invention what is claimed as new and desired to be secured by Letters Patent is:

1. A machine for breaking ear corn into granules comprising a hollow body; an elongated, horizontal reel mounted within the body for rotation about the longitudinal axis thereof and including a shaft, a plurality of supports secured to the shaft in longitudinally spaced relationship and a plurality of bars of slightly spiral longitudinal configuration secured to the supports at the peripheries thereof, extending substantially the length of the reel and each disposed with opposed ends thereof in slight offset relationship longitudinally of the reel, the outer faces of said bars lying substantially in an imaginary cylinder coaxial with said shaft; an elongated, transversely arcuate screen partially surrounding the reel and having a pair of longitudinal edges; an elongated breaker element secured to the body adjacent each of said longitudinal edges of the screen, said elements having relatively straight breaker margins substantially coincidental in length with the bars and in close proximity to the periphery of the reel whereby ears of corn caught between said bars *and screen* and corresponding elements are shelled, fractured and shredded without substantial formation of dust producing particles; and a hopper above the reel for receiving a substantial quantity of said ears to be broken and including inclined structures cooperating with the hopper to present a throat directly overlying the space between the element first approached by the bars during rotation of the reel, and the outer face of an adjacent bar for feeding said ears into said space, said screen being of greater than semicircular transverse cross-sectional length and said last mentioned element being [normally] disposed at a lower elevation than the other element whereby the greatest proportion of ears contained in the hopper are initially directed into said space during rotation of the reel to effect most efficient breaking of the ears, *the distance between said bars and the screen progressively decreasing as the uppermost element is approached.*

2. A machine as set forth in claim 1 wherein the supports are of less radial width between said bars than at the point of interconnection of the bars to respective supports.

3. A machine as set forth in claim 1 wherein is provided a plurality of elongated lugs secured to said outer faces of each of the bars in longitudinally extending relationship thereto, said lugs each having a longitudinal orientation of only slightly greater spiral than the spiral of corresponding bars and the lugs on each being disposed in non-overlapping transverse relationship relative to said bars.

4. A machine for breaking ear corn into granules comprising a hollow body; an elongated, horizontal reel mounted within the body for rotatiion about the longitudinal axis thereof and including a shaft, a plurality of supports secured to the shaft in longitudinally spaced relationship and a plurality of bars secured to the supports at the peripheries thereof, extending substantially the length of the reel and disposed with the outer faces thereof lying substantially in an imaginary cylinder coaxial with said shaft; an elongated, transversely arcuate screen partially surrounding the reel and having a pair of longitudinal edges; an elongated breaker element secured to the body adjacent each of said longitudinal edges of the screen, said elements having relatively straight breaker margins substantially coincidental in length with the bars and in close proximity to the periphery of the reel whereby ears of corn caught between said bars *and screen* and corresponding elements are shelled, fractured and shredded without substantial formation of dust producing particles; and a hopper above the reel for receiving a substantial quantity of said ears to be broken and including inclined structures cooperating with the hopper to present a throat directly overlying the space between the element first approached by the bars during rotation of the reel, and the outer face of an adjacent bar for feeding said ears into said space, said screen being of greater than semicircular transverse cross-sectional length and said last mentioned element being [normally] disposed at a lower elevation than the other element whereby the greatest proportion of ears contained in the hopper are initially directed into said space during rotation of the reel to effect most efficient breaking of the ears, *the distance between said bars and the screen progressively decreasing as the uppermost element is approached.*

*5. A machine for breaking ear corn into granules comprising a hollow body; an elongated, horizontal reel mounted within the body for rotation about the longitudinal axis thereof and including a shaft, a plurality of supports secured to the shaft in longitudinally spaced*

*relationship and a plurality of bars secured to the supports at the peripheries thereof, extending substantially the length of the reel and disposed with the outer faces thereof lying substantially in an imaginary cylinder coaxial with said shaft; an elongated, transversely arcuate screen partially surrounding the reel and having a pair of longitudinal edges; an elongated breaker element secured to the body adjacent each of said longitudinal edges of the screen, said elements having relatively straight breaker margins substantially coincidental in length with the bars and in close proximity to the periphery of the reel whereby ears of corn caught between said bars and the screen and corresponding elements are shelled, fractured and shredded without substantial formation of dust producing particles; and a hopper above the reel for receiving a substantial quantity of said ears to be broken and including inclined structures cooperating with the hopper to present a throat directly overlying the space between the element first approached by the bars during rotation of the reel, and the outer face of an adjacent bar for feeding said ears into said space, said screen being of greater than semicircular transverse cross-sectional length and said last mentioned element being disposed at a lower elevation than the other element and the distance between the periphery of the reel and the element first approached by said bars during rotation of the reel being greater than the distance between the periphery of the reel and said other element whereby the greatest proportion of ears contained in the hopper are initially directed into said space during rotation of the reel to effect most efficient breaking of the ears.*

References Cited in the file of this patent
or the original patent

UNITED STATES PATENTS

| | | |
|---|---|---|
| 26,010 | Burr | Nov. 8, 1859 |
| 97,037 | Buchholz | Nov. 23, 1869 |
| 766,699 | Jorgensen | Aug. 2, 1904 |
| 768,472 | Mack | Aug. 23, 1904 |
| 954,540 | Brillman | Apr. 12, 1910 |
| 2,301,536 | Greenwood | Nov. 10, 1942 |

FOREIGN PATENTS

| | | |
|---|---|---|
| 775 | Germany | Sept. 7, 1877 |